(12) United States Patent
Theis et al.

(10) Patent No.: US 10,552,977 B1
(45) Date of Patent: Feb. 4, 2020

(54) FAST FACE-MORPHING USING NEURAL NETWORKS

(71) Applicant: Twitter, Inc., San Francisco, CA (US)

(72) Inventors: Lucas Theis, London (GB); Iryna Korshunova, Ghent (BE); Wenzhe Shi, London (GB); Zehan Wang, London (GB)

(73) Assignee: Twitter, Inc., San Francisco, CA (US)

( * ) Notice: Subject to any disclaimer, the term of this patent is extended or adjusted under 35 U.S.C. 154(b) by 203 days.

(21) Appl. No.: 15/490,274

(22) Filed: Apr. 18, 2017

(51) Int. Cl.
G06T 7/70 (2017.01)
G06T 11/60 (2006.01)
G06K 9/00 (2006.01)

(52) U.S. Cl.
CPC ............ G06T 7/70 (2017.01); G06K 9/00228 (2013.01); G06T 11/60 (2013.01); G06T 2207/30201 (2013.01)

(58) Field of Classification Search
None
See application file for complete search history.

(56) References Cited

U.S. PATENT DOCUMENTS

| | | | |
|---|---|---|---|
| 6,570,592 B1 | 5/2003 | Sajdak et al. | |
| 6,671,391 B1 * | 12/2003 | Zhang | G06K 9/00228 382/118 |
| 7,242,460 B2 | 7/2007 | Hsu et al. | |
| 7,933,910 B2 | 4/2011 | Ishida et al. | |
| 8,068,652 B2 | 11/2011 | Avinash et al. | |
| 8,520,926 B2 | 8/2013 | Schilling | |
| 8,872,849 B2 | 10/2014 | Zhao et al. | |
| 9,785,858 B2 | 10/2017 | Seifert et al. | |
| 2003/0190060 A1 | 10/2003 | Pengwu | |

(Continued)

FOREIGN PATENT DOCUMENTS

| | | |
|---|---|---|
| WO | 102521807 A | 6/2012 |
| WO | 2016/132152 | 8/2016 |

OTHER PUBLICATIONS

Garrido, Pablo, "Automatic Face Reenactment", Jun. 2014, The IEEE Conference on Computer Vision and Pattern Recognition (CVPR), 2014, pp. 4217,-4224 (Year: 2014).*

(Continued)

*Primary Examiner* — Chan S Park
*Assistant Examiner* — Elisa M Rice
(74) *Attorney, Agent, or Firm* — Brake Hughes Bellermann LLP

(57) ABSTRACT

Systems and methods generate a face-swapped image from a target image using a convolutional neural network trained to apply a source identity to the expression and pose of the target image. The convolutional neural network produces face-swapped images fast enough to transform a video stream. An example method includes aligning the face portion of a target image from an original view to a reference view to generate a target face and generating a swapped face by changing the target face to that of a source identity using a convolutional neural network trained to minimize loss of content from the target face and style from the source identity. The method also includes realigning the swapped face from the reference view to the original view and generating a swapped image by stitching the realigned swapped face with the remaining portion of the target image.

21 Claims, 8 Drawing Sheets

(56) References Cited

U.S. PATENT DOCUMENTS

| | | | |
|---|---|---|---|
| 2012/0197892 A1 | 8/2012 | Achtermann et al. | |
| 2013/0194294 A1 | 8/2013 | Zhao et al. | |
| 2014/0270347 A1 | 9/2014 | Xu et al. | |
| 2015/0029379 A1* | 1/2015 | Kim | H04N 1/00347 348/333.01 |
| 2015/0317788 A1 | 11/2015 | Van Baar et al. | |
| 2016/0086017 A1 | 3/2016 | Rodriguez et al. | |
| 2018/0144526 A1 | 5/2018 | Theis et al. | |

OTHER PUBLICATIONS

L. A. Gatys, A. S. Ecker and M. Bethge, "Image Style Transfer Using Convolutional Neural Networks," 2016 IEEE Conference on Computer Vision and Pattern Recognition (CVPR), Las Vegas, NV, 2016, pp. 2414-2423.doi: 10.1109/CVPR.2016.265, (Year: 2016).*
Bansal, et al., "PixelNet: Towards a General Pixel-Level Architecture", arXiv:1609.06694v1, 2016, 12 pages.
Bitouk, et al., "Face swapping: Automatically replacing faces in photographs", In ACM Transactions on Graphics (SIGGRAPH), 2008, 8 pages.
Chopra et al., "Learning a similarity metric discriminatively, with application to face verification", IEEE Conference on Computer Vision and Pattern Recognition (CVPR), 2005, pp. 539-546.
Dale, et al., "Video face replacement", ACM Transactions on Graphics (SIGGRAPH), vol. 30, 2011, 10 pages.
Deng, et al., "ImageNet: A Large-Scale Hierarchical Image Database", In IEEE Conference on Computer Vision and Pattern Recognition(CVPR), 2009, 8 pages.
Dieleman, et al., "Lasagne", retrieved on Jan. 3, 2017 from https://github.com/Lasagne/Lasagne, Aug. 2015, 3 pages.
Dieleman, et al., "Lasagne—Development", retrieved on Jan. 3, 2017 from http://lasagne.readthedocs.io/en/latest/user/development.html, 5 pages.
Dosovitskiy, "Generating images with perceptual similarity metrics based on deep networks", arXiv:1602.02644, 2016, 14 pages.
Gatys, et al., "Image style transfer using convolutional neural networks", In IEEE Conference on Computer Vision and Pattern Recognition (CVPR), Jun. 2016, pp. 2414-2423.
Georghiades, et al., "From few to many: Illumination cone models for face recognition under variable lighting and pose", IEEE Trans. Pattern Anal. Mach. Intelligence, 23(6), 2001, pp. 643-660.
Goodfellow, et al., "Generative adversarial nets", In Advances in Neural Information Processing Systems 27, 2014, 9 pages.
Johnson, et al., "Perceptual Losses for Real-Time Style Transfer and Super-Resolution", arXiv:1603.08155v1, Mar. 27, 2016, 18 pages.
Kemelmacher-Shlizerman, "Transfiguring portraits", ACM Transaction on Graphics, 35(4), Jul. 2016, 8 pages.
King, "Dlib-ml: A Machine Learning Toolkit", Journal of Machine Learning Research, vol. 10, Jul. 2009, pp. 1755-1758.
Kingma, et al., "Adam: A Method for Stochastic Optimization", ICLR 2015, Jul. 23, 2015, 15 pages.
Ledig et al., "Photo—Realistic Single Image Super-Resolution Using a Generative Adversarial Network", arXiv:1609.04802v3, Nov. 21, 2016, 19 pages.
Li, et al., "Combining Markov Random Fields and Convolutional Neural Networks for Image Synthesis", arXiv:1601.04589v1, Jan. 18, 2016, 9 pages.
Li, et al., "Convolutional Network for Attribute-driven and Identity-preserving Human Face Generation", arXiv:1608.06434v1, Aug. 23, 2016, 9 pages.
Li, et al., "Precomputed Real-Time Texture Synthesis with Markovian Generative Adversarial Networks", arXiv:1604.04382v1, Apr. 15, 2016, 17 pages.
Liu, et al., "Deep Learning Face Attributes in the Wild", In Proceedings of International Conference on Computer Vision (ICCV), Dec. 2015, 9 pages.
Liu, et al., "Multi-Objective Convolutional Learning for Face Labeling", In IEEE Conference on Computer Vision and Pattern Recognition (CVPR), Jun. 7-12, 2015, pp. 3451-3459.
Long, et al., "Fully Convolutional Networks for Semantic Segmentation", In IEEE Conference on Computer Vision and Pattern Recognition (CVPR), 2015, pp. 3431-3440.
GitHub "OpenCV Wiki", retrieved on Jan. 3, 2017 from https://github.com/opencv/opencv/wiki, 2016, 3 pages.
Parkhi, "Deep Face Recognition", In British Machine Vision Conference, 2015, 12 pages.
Paszke, et al., "ENet: A Deep Neural Network Architecture for Real-Time Semantic Segmentation", arXiv:1606.02147v1, Jun. 7, 2016, 10 pages.
Perez, et al., "Poisson Image Editing", In ACM Transactions on Graphics, SIGGRAPH '03, 2003, pp. 313-318.
Ren, et al., "Face Alignment at 3000 FPS via Regressing Local Binary Features", In IEEE Conference on Computer Vision and Pattern Recognition (CVPR), 2014, pp. 1685-1692.
Ronneberger, et al., "U-Net: Convolutional Networks for Biomedical Image Segmentation", Computer Science Department and BIOSS Centre for Biological Signaling Studies, University of Freiburg, Germany, May 18, 2015, pp. 234-241.
Saxe, et al., "Exact solutions to the nonlinear dynamics of learning in deep linear neural networks", arXiv:1312.6120v3, Feb. 19, 2014, 22 pages.
Simonyan, et al., "Very Deep Convolutional Networks for Large-Scale Image Recognition", arXiv:1409.1556v6, Apr. 10, 2015, 14 pages.
Sønderby, et al., "Amortised MAP Inference for Image Super-resolution", arXiv preprint arXiv:1610.04490v1, Oct. 14, 2016, 19 pages.
Suwajanakorn, et al., "What Makes Tom Hanks Look Like Tom Hanks", In 2015 IEEE International Conference on Computer Vision, Dec. 7-13, 2015, pp. 3952-3960.
Al-Rfou, et al., "Theano: A Python framework for fast computation of mathematical expressions", arXiv:1605.02688v1, May 9, 2016, 19 pages.
Ulyanov, et al., "Texture Networks: Feed-Forward Synthesis of Textures and Stylized Images", In International Conference on Machine Learning (ICML), Mar. 10, 2016, 16 pages.
Thies, et al, "Face2Face: Real-time Face Capture and Reenactment of RGB Videos", 2016, 9 pages.
Korshunova, et al., "Fast Face-swap Using Convolutional Neural Networks", arXiv:1611.09577v1, Nov. 29, 2016, 9 pages.
Liu, et al., "Face Hallucination: Theory and Practice", International Journal of Computer Vision, vol. 75, No. 1, Feb. 15, 2007, 34 pages.
Oliveira, et al., "Medical Image Registration: a Review", Computer Methods in Biomechanics and Biomedical Engineering, vol. 17, No. 2, Mar. 22, 2012, 55 pages.
Shih, et al., "Data-Driven Hallucination of Different Times of Day From a Single Outdoor Photo", ACM Transactions on Graphics, vol. 32, No. 6, Nov. 2013, 11 pages.
Shih, et al., "Style Transfer for Headshot Portraits", ACM Transactions on Graphics, vol. 33, No. 4, Jul. 27, 2014, pp. 1-14.
Fechner, et al., "Learning Target Masks in Infrared Linescan Imagery", Proceedings of SPIE, vol. 3077, Apr. 4, 1997, 11 pages.
Hertel, et al., "Deep Convolutional Neural Networks as Generic Feature Extractors", 2015 International Joint Conference on Neural Networks, Jul. 12, 2015, 4 pages.

* cited by examiner

FAST FACE-MORPHING USING NEURAL NETWORKS

BACKGROUND

Face morphing or face swapping involves changing the face or head in a target image to another face or head. Face morphing is relevant in many scenarios including the provision of privacy, appearance transfiguration in portraits, video compositing, and other creative applications. Face swapping can be obvious, e.g., lacking photorealism, or photorealistic. While methods for obvious face swapping can be fast, the result is often cartoonish. Photorealistic face morphing can be done manually, but this process is obviously slow and does not scale. Face morphing can also be done by substituting an input face with another face selected from a large database of images that is selected based on the similarity of appearance and pose, but this alters the expression of the target image and there is no control over the identity appearing in the resulting image.

SUMMARY

Implementations provide a trained neural network, also referred to as an identity transformation network, that replaces the identity of a target image with a source identity in real-time. Thus, the identity transformation network can be used to change the identity of a face in a video stream. Disclosed implementations train the identity transformation network to keep the content of the target image but replace it with a style of the source identity. Thus, implementations control the identity appearing in the resulting image. Implementations first align the face in the target image with a reference view. The system then generates a swapped image that keeps the content, e.g., the expression, gaze direction, pose, etc., of the target face while applying the style, e.g., nose, eyes, eyebrows, lips, etc., of the source identity. The identity transformation network uses an objective function that minimizes content loss of the target and style loss of the source identity and may optionally minimize or penalize illumination changes from the target image. The system then re-aligns the swapped face with the original orientation of the target image and stitches the swapped face into the target image. The result is a photo-realistic swapped image. In some implementations, the process may be completed in under 90 milliseconds or faster, depending on hardware, which is fast enough to be performed on frames of a video stream.

According to one aspect, a method includes receiving a target image. The target image includes a face portion and a remaining portion. The method also includes aligning the face portion from an original view to a reference view to generate a target face and generating a swapped face by changing the target face to that of a source identity using a convolutional neural network trained to minimize loss of content from the target face and style from the source identity. The method also includes realigning the swapped face from the reference view to the original view and generating a swapped image by stitching the realigned swapped face with the remaining portion of the target image.

According to one aspect, a computer-readable medium stores an identity transformation neural network trained to generate a swapped face from a target face by changing the target face to that of a source identity. The identity transformation neural network may be trained by generating, from a plurality of images of the source identity, a set of style images for the source identity. Each of the plurality of images has a face portion and a remaining portion. Generating the set of style images includes, for each of the plurality of images, aligning the source face from a respective original view to a reference view. Training the identity transformation neural network also includes generating, from a subset of images in a content image library, target faces. Each image in the subset has a face portion and a remaining portion. Generating the target faces includes, for each of the images in the subset of images, aligning the face portion from a respective original view to the reference view. Training the identity transformation neural network also includes iteratively training the identity transformation neural network to generate a swapped face that changes a target face to the source identity by optimizing a loss function that is a weighted combination of content loss from the target face and style loss from the set of style images.

According to one aspect, a method includes receiving a target image, the target image including a face portion and a remaining portion. The method also include aligning the face portion from an original view to a reference view to provide a target face. The method also includes generating a swapped face by changing the target face to that of a source identity using a identity transformation network trained to minimize loss of content from a target face and style from a source identity. The method also includes realigning the swapped face from the reference view to the original view and generating a swapped image by stitching the realigned swapped face with the remaining portion of the target image.

In another aspect, a computer program product embodied on a computer-readable storage device includes instructions that, when executed by at least one processor formed in a substrate, cause a computing device to perform any of the disclosed methods, operations, or processes disclosed herein. In another aspect, a system includes at least one processor and a memory string instructions that, when executed by the at least one processor, performs any of the methods or operations disclosed herein.

One or more of the implementations of the subject matter described herein can be implemented so as to realize one or more of the following advantages. As one example, implementations achieve face swapping with high levels of photorealism in about 90-100 ms, depending on the components used for segmentation, image alignment, facial key-point detection, and seamless cloning. The identity transformation network can provide a swapped face, e.g., not stitched into the original image, in as little as 40 ms for a 256×256 image. As another example, weights used to train the face-morphing network can be adjusted so the output image looks more like conventional face swapping, or in other words, less of the facial expression of the original image is kept, but the pose and lighting are kept. The face-morphing network can be trained with a few style images, although the more style images available the more realistic the result. Style images are images of a particular source identity (e.g., a person or an animal). While implementations can be trained using only one image, more photorealistic results will result from training on style images that cover different ranges in facial expressions, angles, lighting, poses, etc. Good photorealism can be achieved using less than 100 style images.

The details of one or more implementations are set forth in the accompanying drawings and the description below. Other features will be apparent from the description and drawings, and from the claims.

BRIEF DESCRIPTION OF DRAWINGS

Like reference symbols in the various drawings indicate like elements.

DETAILED DESCRIPTION

Figure 1:
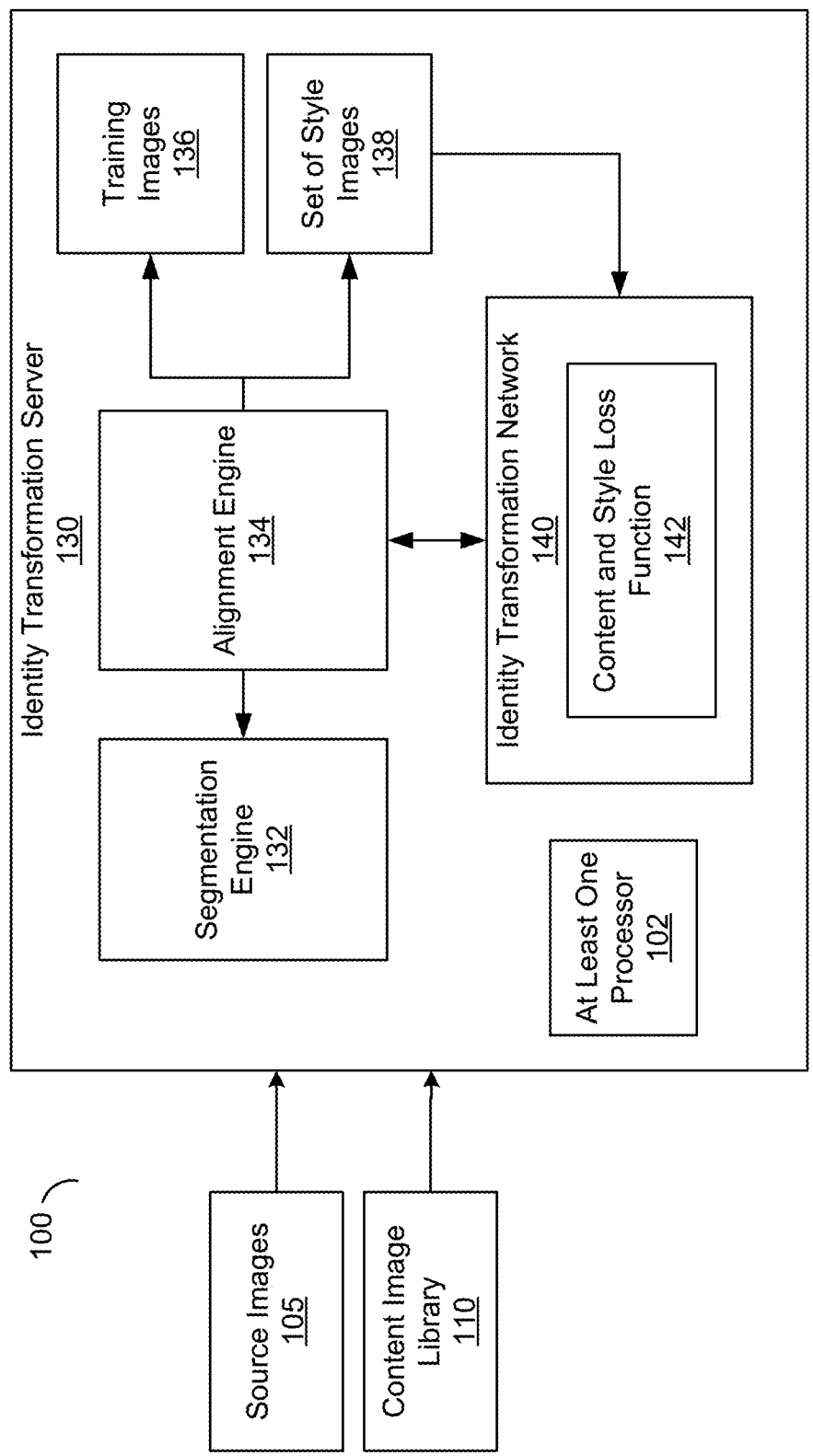
FIG. 1 illustrates an example system for learning an identity transformation network, in accordance with the disclosed subject matter.

FIG. 1 is a block diagram of an identity transformation system 100 in accordance with an example implementation. The system 100 may be used to train and use a neural network that generates photorealistic face-swapped images in real time. The system 100 optimizes an objective loss function that minimizes content loss and style loss between a target image and a source identity, the source identity being represented by a set of style images. In some implementations, the objective loss function may also penalize illumination changes from the target image. Once trained, the system can generate face-swapped images fast enough to process frames of a video stream, enabling the system 100 to be used in video streaming applications. Once trained, the system 100 needs little to no input, other than supplying a target image, to generate the face-swapped images.

Figure 8:
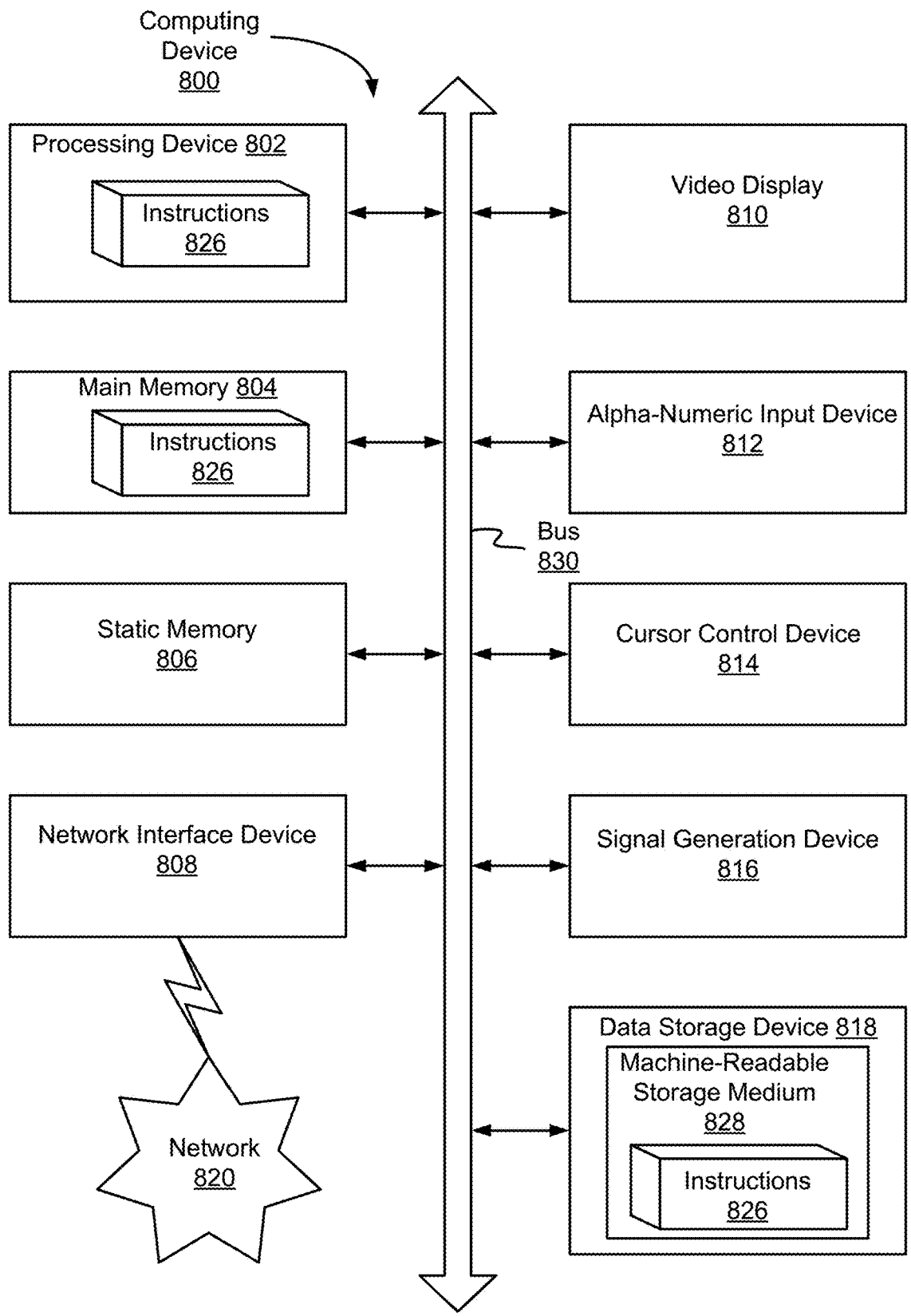
FIG. 8 shows an example of a distributed computer device that can be used to implement the described techniques.

The identity transformation system 100 can include an identity transformation server 130. The identity transformation server 130 may be a computing device or devices that take the form of a number of different devices, for example, a standard server, a group of such servers, or a rack server system. In addition, in some implementations, server 130 may be implemented in a personal computer, for example, a desk top or laptop computer. The identity transformation server 130 may be an example of computer device 800, as depicted in FIG. 8.

The identity transformation server 130 can include one or more processors 102 formed in a substrate configured to execute one or more machine executable instructions or pieces of software, firmware, or a combination thereof. The processors 102 can be semiconductor-based—that is, the processors can include semiconductor material that can perform digital logic. The processors 102 may be a specialized processing unit, e.g., a graphics processing unit (GPU), such as a Tesla M40 GPU, or an embedded processing unit. The identity transformation system 100 can also include an operating system (not shown) and one or more computer memories, for example, a main memory, configured to store one or more pieces of data, either temporarily, permanently, semi-permanently, or a combination thereof. The memory may include any type of storage device that stores information in a format that can be read and/or executed by the one or more processors. The memory may include volatile memory, non-volatile memory, or a combination thereof, and store modules that, when executed by the one or more processors, perform certain operations. In some implementations, the modules may be stored in an external storage device and loaded into the memory of system 100.

The identity transformation server 130 may include or have access to source images 105 and a content image library 110. In some implementations, the source images 105 and/or the content image library 110 may be accessible to the identity transformation server 130 via a network, such as the Internet, a cellular network, a wide-area-network, etc. In some implementations, the source images 105 and/or the content image library 110 may be stored at the identity transformation server 130. The source images 105 include images of the source identity that the trained identity transformation network 140 will morph a target image into. In other words, the source images 105 describe the identity that results from transformation of a target image by the identity transformation network 140. The source images 105 include different poses and facial expressions of the source identity. The source identity can be a person. The source identity can be an animal. The source identity can be anything with facial features that can be aligned using face alignment to align facial features, such as eyes, nose, etc. In some implementations, the source images 105 may include just a few images, e.g., 20 to 60 images, of the source identity. Additional source images 105 may increase training time but may make the resulting face-swapped image more realistic. In some implementations, the images in the source images 105 may have a pose that generally conforms to a reference view, e.g., a frontal view, a partial-profile view, or a profile view. In some implementations, the source images 105 may include a few images, e.g., 20 to 60, from two or more reference views. The greater the number of views represented by the source images 105 the more accurate the system will be for target images of all views. If one particular reference view dominates the source images 105 the system will perform best with a target image generally conforms to the particular reference view.

The content image library 110 may include images of other faces that will serve as training images 136 for the identity transformation network 140. For example, the content image library 110 may include datasets of images of people, such as celebrities. In some implementations, the source images 105 may be images in the content image library 110 that are for the source identity and remaining images in the content image library 110 may be used as training images 136. In some implementations, the content image library 110 may be images available on the Internet. The source images 105 and the images in the content image library 110 can be in any image file format. In some implementations the training images 136 include diversity in pose, lighting, expressions, etc. Greater diversity in these features results in a model that produces better looking results.

The modules in the identity transformation server 130 include a segmentation engine 132 and an alignment engine 134. The segmentation engine 132 is capable of restoring the background and hair of an input image to a face-swapped image. In other words, the segmentation engine 132 stitches the face generated by the identity transformation network 140 into the background and hair of the original target image. In some implementations, the segmentation engine 132 generates a segmentation mask for stitching the generated swapped image into the background of the original image. The segmentation engine 132 may be similar to the seamless cloning technique available at OpenCV or may include a neural network trained to perform the segmentation.

The alignment engine 134 ensures that a face in a given image is aligned with a reference view. For example, the alignment engine 134 may ensure a face in a provided image is aligned with a frontal view. In some implementations, the identity transformation server 130 may include an alignment engine 134 for each of a number of reference views. For example one alignment engine 134 may align an image with a frontal view, another alignment engine 134 may align an image with a profile view, and another alignment engine 134 may align the image with a partial profile view. In some implementations, a reference view is a view that eliminates tilting of the face. In some implementations, the alignment engine 134 may achieve alignment with the reference view using an affine transformation, which aligns facial keypoints from a given image to reference keypoints for the reference view. An example affine transformation is available in the dlib C++ library. The alignment engine 134 may also ensure that the swapped face is re-aligned with the original view, i.e., the view of the target image, using a reverse of the affine transformation performed on the target image.

The identity transformation server 130 may use the alignment engine 134 to generate training images 136 and the set of style images 138. The set of style images 138 are images from the source images 105 that have been processed by the alignment engine 134. Thus, the training images 136 are aligned with a reference view. Similarly, the set of style images 138 are aligned to the reference view. As indicated above, the reference view may be a frontal view, a profile view, or a partial profile view. In some implementations all the images in the training images 136 and the set of style images 138 are aligned to the same reference view. The training images 136 and the set of style images 138 may be stored locally to the identity transformation server 130 or may be remote to, but accessible by, the identity transformation server 130.

The identity transformation server 130 may train an identity transformation network 140 to apply the style represented by the set of style images 138 to the training images 136 by minimizing a content and style loss function 142. The identity transformation network 140 is a neural network, which is an interconnected group of nodes, each node representing an artificial neuron. The nodes are connected to each other in layers, with the output of one layer becoming the input of a next layer. Neural networks transform an input, received by the input layer, transform it through a series of hidden layers, and produce an output via the output layer. Each layer is made up of a subset of the set of nodes. The nodes in hidden layers are fully connected to all nodes in the previous layer and provide their output to all nodes in the next layer. The nodes in a single layer function independently of each other (i.e., do not share connections). Nodes in the output provide the transformed input to the requesting process.

In some implementations, the identity transformation network 140 may be convolutional neural network, which is a neural network that is not fully connected. Convolutional neural networks therefore have less complexity than fully connected neural networks. Convolutional neural networks can also make use of pooling or max-pooling to reduce the dimensionality (and hence complexity) of the data that flows through the neural network and thus this can reduce the level of computation required. This makes computation of the output in a convolutional neural network faster than in a neural networks. In some implementations, the identity transformation network 140 may be a visual geometry group (VGG) convolutional network. A VGG convolutional network is specialized convolutional neural network for object recognition. In some implementations, the VGG may be trained for face recognition rather object recognition.

The identity transformation network 140 takes in a target face, e.g., one of the training images 136, and generates a swapped face that jointly minimizes content loss from the target face and style loss from the set of style images 138. Content of the target image includes expression and pose. The expression and pose includes things like gaze direction, lip expression, makeup, skin tone, lighting, etc. The style of the set of style images 138 represents features that define the source identity, e.g., nose shape, eye color and shape, eyebrow shape, wrinkles, etc. The identity transformation network 140 uses a content and style loss function 142 to minimize the content and style loss during the transformation. The content and style loss function 142 can be a weighted combination of a number of loss factors. The loss factors include a content loss factor and a style loss factor. The content loss factor may be represented by the sum of the content loss between the training image and the output of the identity transformation network 140, i.e., the swapped face, at each layer. The identity transformation network 140 may seek to minimize the content loss. The content loss at a particular layer l of the neural network ($\mathcal{L}_{content}$ ($\hat{x}$, x, l)) can be represented by $$\frac{1}{|\Phi_l(x)|}\|\Phi_l(\hat{x}) - \Phi_l(x)\|_2^2,$$

where $\Phi_l(x)$ represents the target face in layer l, $\Phi_l(\hat{x})$ represents the swapped face in layer l, and $|\Phi_l(x)|=C_l H_l W_l$ represents the dimensionality of $\Phi_l(x)$ with shape $C_l \times H_l \times W_l$. The overall content loss, e.g., over all layers, may be expressed as $\mathcal{L}_{content}$ ($\hat{x}$, x)$=\Sigma_l \mathcal{L}_{content}$ ($\hat{x}$, x, l)

The style loss factor may be represented by the sum, over all layers of the identity transformation network, of the style loss between the set of style images (Y) and the swapped face ($\hat{x}$) at each layer. The identity transformation network 140 may compute style loss for each of a plurality of patches. In other words, if $\Phi_l(\hat{x})$ represents the swapped face in layer 1, the system may loop over $H_l \times W_l$ possible locations in $\Phi_l(\hat{x})$ and extract a k×k neighborhood around each point. In some implementations, k=1. Thus, the system generates M possible patches (M=$(H_l-k+1) \times (W_l-k+1)$). An $i^{th}$ patch of the M patches in layer l may be represented by $\Psi_i(\Phi_l(\hat{x}))$. The style loss at layer l of the neural network ($\mathcal{L}_{style}$ ($\hat{x}$, Y, l)) can be represented by $$\frac{1}{M}\sum_{i=1}^{M} d_c(\Psi_i(\Phi_l(\hat{x})), \Psi_i(\Phi_l(y_{NN(i)}))),$$

where $d_c$ is a distance metric and y represents one of the style images in the set of style images (Y). In some implementations, $d_c$ is a cosine distance. The distance metric measures a distance between a patch in the swapped face $\Psi_i(\Phi_l(\hat{x}))$ and a best-matching patch at the same location of images in the style set of images 138 for the source identity, and the identity transformation network aims to minimize this distance. The best-matching patch at the same location can be represented by $\Psi_i(\Phi_l(y_{NN(i)}))$, where NN(i) selects the best-matching patch, for each patch at location i, from the images in the set of style images 138. In some implementations, NN(i) may be represented by arg $\min_{j=1,\ldots,N_{best}} d_c(\Psi_i(\Phi_l(\hat{x})), \Psi_i(\Phi_l(y_j)))$. In other words, the identity transformation network 140 may search for patches in the same location i, but across multiple style images from the set of style images 138. In some implementations, the system may only look at a subset of the images in the set of style images 138. If N represents the number of images in the set of style images 138, $N_{best}$ may be a smaller subset of N. The system 100 may sort the N images by a measure of similarity with the target face. In some implementations, the measure of similarity may be a Euclidean distance between the facial landmarks of the image in the style set and the target face. The system 100 may sort the N images by the similarity metric to the target face to determine the $N_{best}$ images of the set of style images 138 for the particular target face. Thus, some implementations may consider all images (j=1, . . . , N) in the style set of images and some implementations may consider the best images (j=1, . . . , $N_{best}$). In some implementations, $N_{best}$ represents 16 of the N images. Similar to the content loss, the overall style loss may be the sum of the style loss over all layers of the neural network, which can be expressed as $\mathcal{L}_{style}(\hat{x}, Y) = \Sigma_l \mathcal{L}_{style}(\hat{x}, Y, l)$.

In some implementations, the loss factors of the content and style loss function 142 may include an illumination penalty factor. The lighting conditions of the target face (x) are not preserved via the content loss factor described above. Thus, in some implementations, the content and style loss function 142 may introduce a factor that penalizes changes in illumination from the target face. In some implementations, the illumination penalty may use a feature space of a pre-trained neural network, referred to as a lighting network. The lighting network may be a siamese convolutional neural network. The lighting network may be trained to discriminate between pairs of images with either equal or different illumination conditions. The pairs of images used to train the lighting network may have the same pose, but differ in either identity and/or lighting. Thus, the lighting network may be used to prevent the generated images, e.g., the swapped images ($\hat{x}$), from having different illumination conditions from those of the target face (x). The feature representation of the swapped face in the last layer (the output layer) of the lighting network may be expressed as $\Gamma(\hat{x})$ and the feature representation of the target face may be expressed as $\Gamma(x)$. The loss factor ($\mathcal{L}_{light}(\hat{x}, x)$) in the content and style loss function 142 may be expressed as $$\frac{1}{|\Gamma(x)|} \|\Gamma(\hat{x}) - \Gamma(x)\|_2^2.$$

In some implementations, the loss factors for the content and style loss function 142 may include a total variation regularization factor. The total variation regularization factor may encourage spatial smoothness. The total variation regularization factor ($\mathcal{L}_{TV}(\hat{x})$) may be expressed as $\mathcal{L}_{TV}(\hat{x}) = \Sigma_{i,j}((\hat{x}_{i,j+1} - \hat{x}_{i,j})^2 + (\hat{x}_{i+1,j} - \hat{x}_{i,j})^2)$.

The loss factors of the content and style loss function 142 may be weighted. For example, in one implementation, the loss function 142 may be expressed as $\mathcal{L}_{conent}(\hat{x}, x) + \alpha \mathcal{L}_{style}(\hat{x}, Y)$, where α is a style weight for the style loss. The higher the weight α, the more the resulting swapped face ($\hat{x}$) will resemble the source identity. However, a higher value for the style weight α will also result in loss of content (e.g., expression) of the original face. Thus, the style weight can be adjusted to keep more content or less content, as desired. In some implementations, the style weight may range from 20 to 80. In some implementations, the style weight may be 120.

Figure 7:
FIG. 7 illustrates differences in example swapped images for an identity transformation network that includes an illumination penalty and an example identity transformation network without an illumination penalty, in accordance with disclosed subject matter.

In some implementations, the loss function 142 may be expressed as $\mathcal{L}_{conent}(\hat{x}, x) + \alpha \mathcal{L}_{style}(\hat{x}, Y) + \beta \mathcal{L}_{light}(\hat{x}, x)$, where β is an illumination weight. In some implementations, the illumination weight may be about $10^{-22}$, which makes the illumination penalty comparable to the content loss and style loss. FIG. 7 illustrates differences in example swapped images for an identity transformation network that includes an illumination penalty and an example identity transformation network without an illumination penalty, in accordance with disclosed subject matter. In the example of FIG. 7, the images in column 705 represent the target images (e.g., a training image from training images 136 or a target image 205). The images in column 710 represent swapped images where the identity transformation network 140 has a content and style loss function 142 that includes an illumination penalty. The images in column 715 represent swapped images generated by an identity transformation network 140 that has a content and style loss function 142 that does not include an illumination penalty. In other words, the images of column 715 lack the illumination penalty factor. FIG. 7 illustrates that the swapped images of column 715 lack shadows and appear flatter than the swapped images of column 710.

In some implementations, the loss function 142 may be expressed as $\mathcal{L}_{conent}(\hat{x}, x) + \alpha \mathcal{L}_{style}(\hat{x}, Y) + \beta \mathcal{L}_{light}(\hat{x}, x) + \gamma \mathcal{L}_{TV}(\hat{x})$ or $\mathcal{L}_{conent}(\hat{x}, x) + \alpha \mathcal{L}_{style}(\hat{x}, Y) + \gamma \mathcal{L}_{TV}(\hat{x})$, where γ is a total variation weight. In some implementations, the total variation weight may be about 0.3. Of course the total variation weight can be tuned for different applications. In some implementations, the loss function 142 may include an expression loss factor, which may be used to maintain the facial expression or emotion in the target face. Other similar factors may be used to tune the loss function 142.

Once the identity transformation network 140 has generated a swapped face, the swapped face may be provided to the alignment engine 134, which may re-align the swapped face with the original view, i.e., the view of the original image. This may reverse the alignment used to generate the target face. The alignment engine 134 may provide the re-aligned swapped face and the target image to the segmentation engine 132. The segmentation may then stitch the swapped face into the target image, generating a swapped image that has the background and hair (or fur) of the original target image and the swapped face generated by the identity transformation network 140. The system may repeat the process of training the identity transformation network 140 with training images for several iterations, e.g., 10 thousand iterations. In some implementations, the style weight may be gradually increased from zero to a maximum weight (e.g., 20 or 80) during training. In some implementations, the identity transformation network 140 may be trained on inputs of a first size and then later trained on inputs of a second size where the additional branch is optimized while keeping the rest of the network fixed. For example, the identity transformation network 140 may be trained for 128×128 inputs first and an extra branch for 256×256 images added after the initial training. In some implementations, the identity transformation network 140 takes about 12 hours to train and has about 2 million parameters, of which half are trained during the second state (e.g., for 256×256 images).

Although not illustrated in FIG. 1, identity transformation system 100 may be in communication with client(s) over a network. The clients may enable a user to provide parameters for the training of the identity transformation network 140, to identify the source images 105 and/or the content image library 110, to provide the weights, etc. The network may also enable the identity transformation server 130 to access one or more remote modules, images, libraries, etc. The network may be for example, the Internet or the network can be a wired or wireless local area network (LAN), wide area network (WAN), etc., implemented using, for example, gateway devices, bridges, switches, and/or so forth. In some implementations, identity transformation system 100 may be in communication with or include other computing devices that store the content image library 110, the source images 105, the alignment engine 134, and/or the segmentation engine 132. Identity transformation system 100 represents one example configuration and other configurations are possible. Thus, for example, components of system 100 may be combined or distributed in a manner differently than illustrated.

Figure 2:
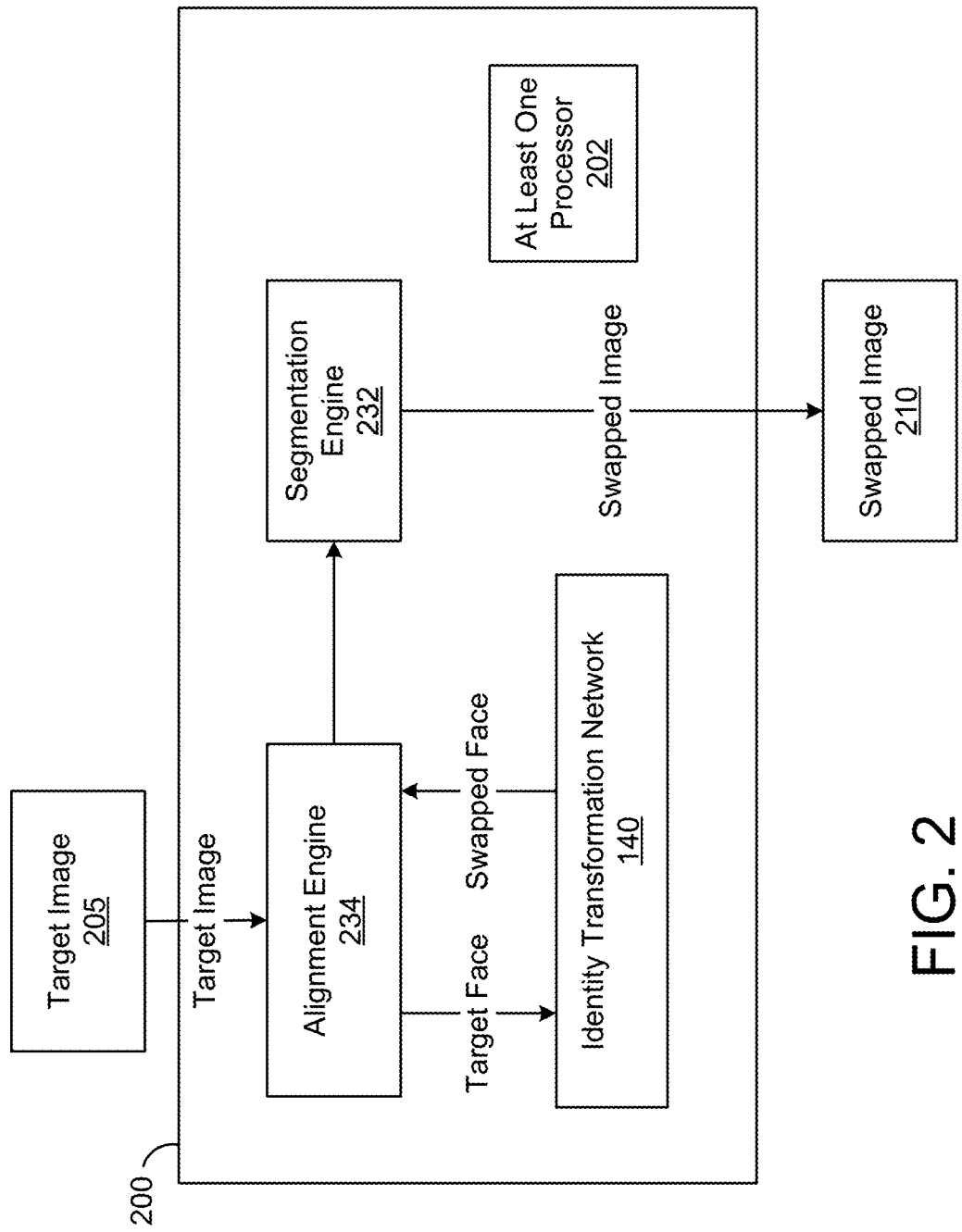
FIG. 2 illustrates an example system for using an identity transformation network, in accordance with the disclosed subject matter.

FIG. 2 illustrates an example system for using the identity transformation network, in accordance with the disclosed subject matter. The identity transformation system 200 may be a computing device or devices that take the form of a number of different devices, for example, a standard server, a group of such servers, or a rack server system. In addition, identity transformation system 200 may be implemented in a personal computer, for example, a desktop or laptop computer. The identity transformation system 200 may be an example of computer device 800, as depicted in FIG. 8.

The identity transformation system 200 can include one or more processors 202 formed in a substrate configured to execute one or more machine executable instructions or pieces of software, firmware, or a combination thereof. The processors 202 can be semiconductor-based—that is, the processors can include semiconductor material that can perform digital logic. The processors 202 can include specialized processors, e.g., a GPU, such as GTX Titan GPU, or embedded processor unit. The processor 102 used to train the identity transformation network 140 may be a different processor than the processor 202 on which the identity transformation network performs transformations. The identity transformation system 200 can also include an operating system (not shown) and one or more computer memories, for example, a main memory, configured to store one or more pieces of data, either temporarily, permanently, semi-permanently, or a combination thereof. The memory may include any type of storage device that stores information in a format that can be read and/or executed by the one or more processors. The memory may include volatile memory, non-volatile memory, or a combination thereof, and store modules that, when executed by the one or more processors, perform certain operations. In some implementations, the modules may be stored in an external storage device and loaded into the memory of system 200.

The identity transformation system 200 includes an alignment engine 234, a segmentation engine 232, and a trained identity transformation network 140. The alignment engine 234 and the segmentation engine 232 are similar to the alignment engine 134 and segmentation engine 132 discussed above with regard to FIG. 1. The system 200 may receive a target image 205 and transform the identity of the target image 205 to a swapped image 210 that retains the content (background, pose, expression, etc.) of the target image but has a source identity, i.e. the source identity on which the identity transformation network 140 was trained. The target image 205 may be stored on memory local to the identity transformation system 200 or may be stored on memory remote from but accessible to (e.g., via a network) the identity transformation system 200. The target image 205 can be in any image file format.

The target image 205 may be provided to the alignment engine 234, which aligns the face in the target image with a reference view, changing the face from an original view to the reference view. The face aligned with the reference view is referred to as the target face. In some implementations, where the identity transformation network 140 has been trained on multiple reference views, or the identity transformation system 200 includes multiple identity transformation networks 140, one for each reference view, the alignment engine 234 may select a reference view that is closest to the original view of the target image 205. The alignment engine 234 provides the target face to the identity transformation network 140, which has been trained to transform the target face to a source identity by minimizing content loss of the target face while minimizing style loss of the source identity, represented by the set of style images 138 used to train the identity transformation network 140. In some implementations, the alignment engine 234 or another module or engine selects the identity transformation network 140 based on parameters (e.g., a desired source identity, the reference view, etc.). The identity transformation network 140 may provide a swapped face to the alignment engine 234 (or another similar engine), which re-aligns the swapped face with the original view of the target image 205. The alignment engine 234 provides the re-aligned swapped face and the target image to the segmentation engine 232. The segmentation engine 232 segments out the background and hair from the target image 205 and stitches the swapped face into the target image 205 to generate the swapped image 210. The swapped image 210 may then be provided to a requesting process or user, e.g., the process or user that provided the target image 205.

The identity transformation system 200 may be communicatively connected to identity transformation system 100 and may receive an updated identity transformation network 140 periodically, or may receive a different identity transformation network 140 trained to transform the target image into a different source identity. In some implementations, the identity transformation system 100 may include a module or engine to determine which source identity is requested. Although illustrated as separate systems, in some implementations, identity transformation system 200 and identity transformation system 100 may be the same system or elements of a distributed computing system.

Figure 3:
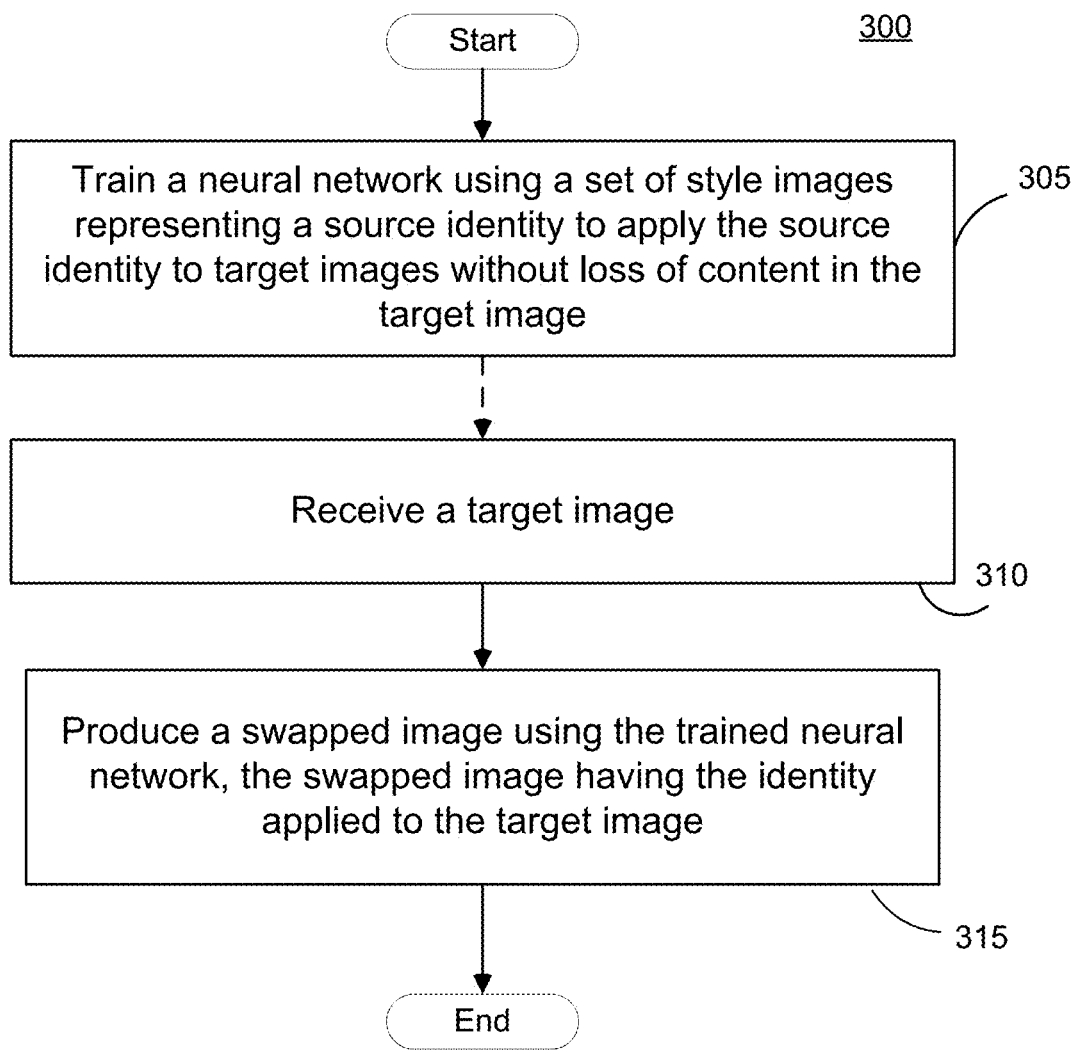
FIG. 3 illustrates a flow diagram of an example process for training and using an identity transformation network, in accordance with disclosed subject matter.

FIG. 3 illustrates a flow diagram of an example process 300 for training and using an identity transformation network, in accordance with disclosed subject matter. Process 300 may be performed by an identity transformation system, such as system 100 of FIG. 1 and/or an image processing system, such as system 200 of FIG. 2. Process 300 may begin with the identity transformation system training a neural network using a set of style images representing a source identity to apply the source identity to target images while minimizing loss of content in the target image (305). The neural network may also be referred to as an identity transformation network. The neural network may be a convolutional neural network or a visual geometry group convolutional neural network. The neural network may optimize a loss function that is a weighted combination of content loss and style loss. The loss function can also include an illumination penalty factor that discourages lighting changes and/or a total variation regularization factor that encourages spatial smoothness. Once the identity transformation network is trained it may be used to generate a swapped image from a target image. In some implementations, the identity transformation network may be run on a different computing system than the one used to train the identity transformation network.

The system may receive a target image (310). The target image may be provided by a user or by a process. The system may use the identity transformation network, an alignment engine, and a segmentation engine to produce a swapped image (315). The swapped image has the source identity applied to the target image. Thus, for example, the system preserves the background, hair, pose, and expression of the target image while morphing the facial features, e.g., eyes, nose, etc., to that of the source identity. In some implementations, the target image may be a frame in a video stream. Thus, the system can repeat steps 310 and 315 for each frame in the video stream, transforming an identity in the video stream to that of the source identity. In other words, the system may provide the swapped image fast enough to be used in real-time. The system may provide the swapped image to the requesting user or process. Process 300 then ends.

Figure 4:
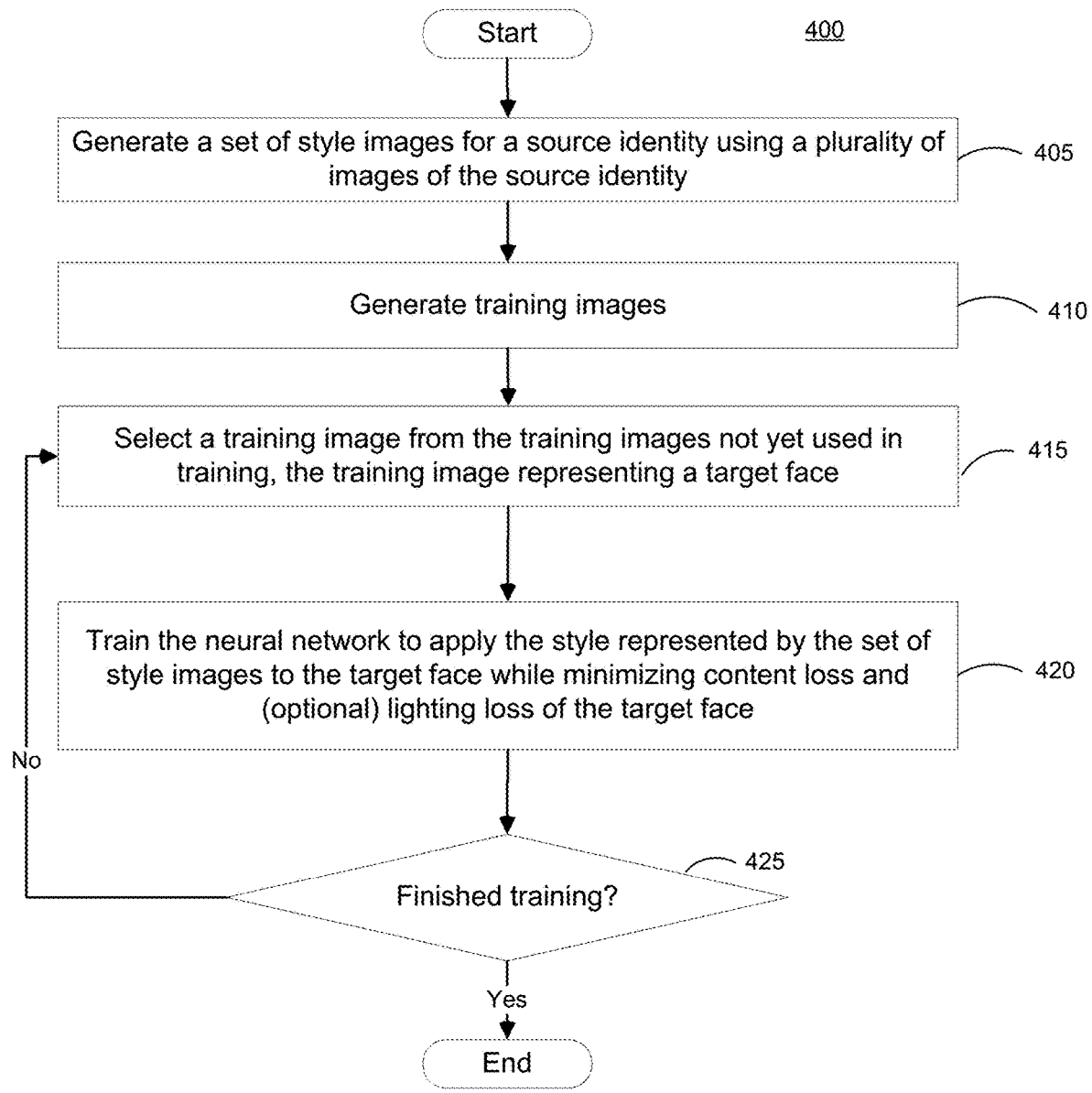
FIG. 4 illustrates a flow diagram of an example process for training an identity transformation network, in accordance with disclosed subject matter.

FIG. 4 illustrates a flow diagram of an example process 400 for training an identity transformation network, in accordance with disclosed subject matter. Process 400 may be performed as part of step 305 of FIG. 3. Process 400 is used to train an identity transformation network to apply the style of the source identity to target images. Applying the style means minimizing content loss, including pose and expression, of the target image but morphing the facial features to appear as the source identity. The system may represent the source identity through a set of style images. Accordingly, the system may generate a set of style images for a source identity using a plurality of images of the source identity (405). Each image in the set of style images is aligned with a reference view from their original view. The reference view can be a frontal view. The reference view can also be a profile view. The reference view can be a partial profile view. The images in the set of style images may all be of a particular size, e.g., 128×128 or 256×256. The source identity can be any person, animal, or other thing with a face. The neural network is trained on a specific identity, so the expected swapped image appears to be that of the source identity.

The system may also generate training images (410). The training images are each a target image from a large image collection that also include a face. As part of generating the training images, the system may align the face in the training image with a reference view from their original view. Alignment with the reference view may include turning the face and/or rotating the face. A training image aligned with the reference view may also be referred to as a target face. The training images may be selected from a library of images, e.g., an image dataset or images available via the Internet. The system selects a target face from the target faces not yet processed (415). The system may use the target face to train the neural network to apply the style represented by the set of style images to the target face while minimizing content loss and, optionally, illumination features, of the target face. (420). The system may continue selecting target faces (425, No) and using them in training (420) until training is complete (425, Yes). In some implementations, the neural network may be trained over a plurality of iterations, e.g., 10,000 iterations. In some implementations, the system may repeat process 400 with training images of a different size to train an additional branch of the neural network. For example, the system may first train the neural network with images of a first size of 128×128 and then train the neural network with images of a second size, e.g., 256×256, optimizing that branch but keeping the rest of the network fixed. Once all training is complete, process 400 ends.

Figure 5:
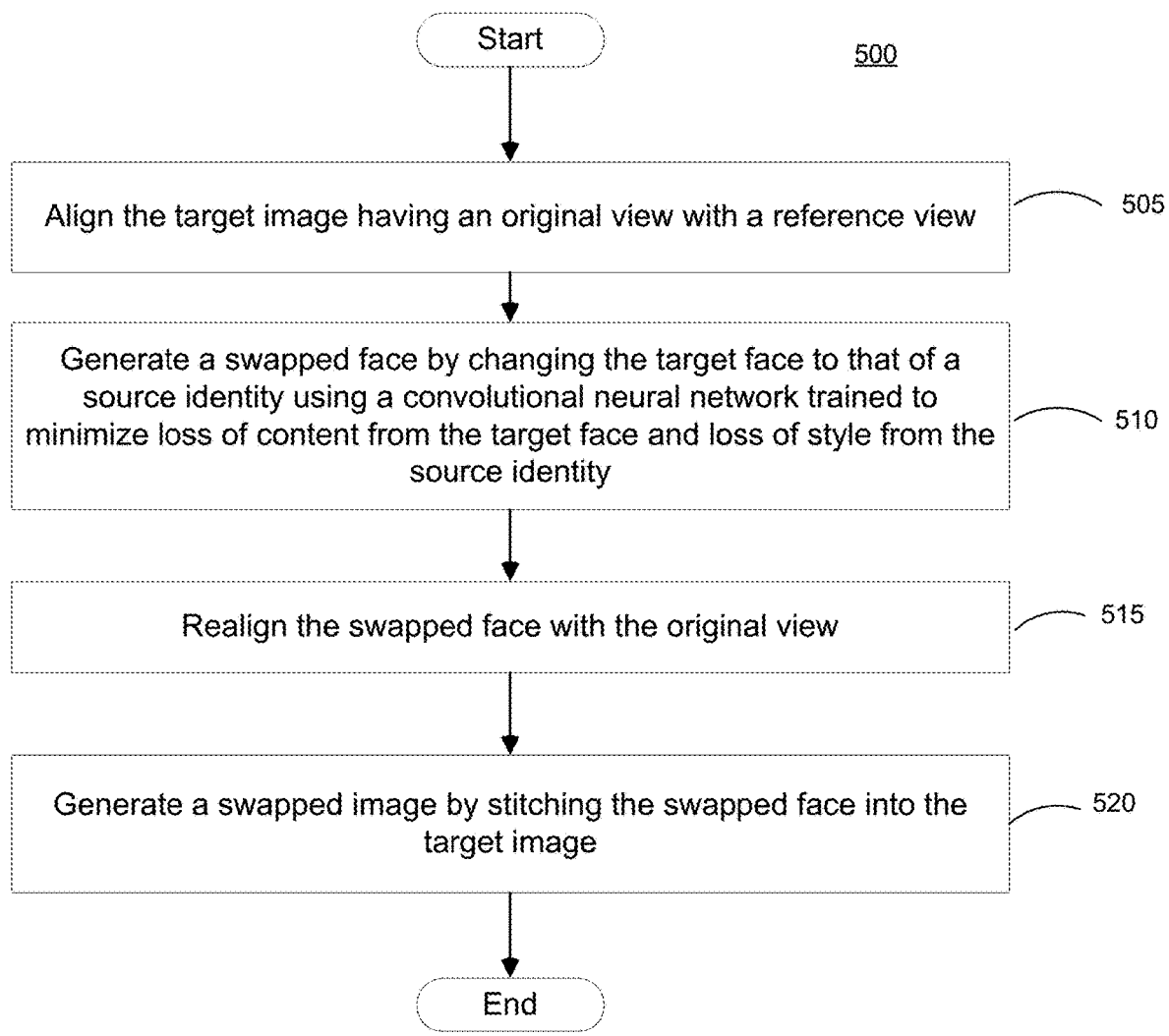
FIG. 5 illustrates a flow diagram of an example process for using an identity transformation network, in accordance with disclosed subject matter.

FIG. 5 illustrates a flow diagram of an example process 500 for using an identity transformation network, in accordance with disclosed subject matter. Process 500 may be executed as part of step 315 of FIG. 3. Process 500 generates a swapped image from a target image using the trained neural network, i.e., the identity transformation network. The system may first align the target image from its original view to a reference view (505). The reference view is a view that the identity transformation network expects. The view that the identity transformation network expects depends on which reference view or views the identity transformation network was trained on. The system may generate a swapped face by changing the target face to that of a source identity using the identity transformation network (510). The identity transformation network is trained to minimize content loss from the target face and to minimize style loss from the source identity. The identity transformation network optimizes an objective function, e.g., loss function 142 of FIG. 1, to transform the target face to a swapped face. The loss function includes a content loss factor and a style loss factor, which were discussed in more detail above with regard to FIG. 1. The objective function can also include an illumination penalty factor that penalizes changes to illumination from the target face. The objective function can also include a total variation regularization factor that encourage spatial smoothness. The identity transformation network provides, as output, a swapped face. The swapped face is an image file that results from the transformation by the neural network of the target face. The system may re-align the swapped face with the original view of the target face (515). This may be accomplished via an alignment engine. In some implementations the alignment engine accomplishes re-alignment via an affine transformation. The system may then generate the swapped image by restoring the background and hair of the target image using a segmentation engine (520). In some implementations, the segmentation engine may use a seamless cloning technique or a separately trained machine learning algorithm. Put another way, the system stitches the face of the swapped face into the target image to generate the swapped image. Thus, the resulting swapped image has the background, hair, pose, expression, and skin tone of the target image but the style, or facial features, of the source identity. Process 500 then ends and may be repeated for another target image.

Figure 6:
FIG. 6 illustrates example target images, example swapped faces, and example swapped images generated with two example identity transformation networks, in accordance with disclosed subject matter.

FIG. 6 illustrates example target images, example swapped faces, and example swapped images generated with two example identity transformation networks, in accordance with disclosed subject matter. In the example of FIG. 5, items 605 represent target images. Items 610 represent swapped images, with the source identity being Nicolas Cage. Items 615 represent swapped images, with the source identity being Taylor Swift. Items 620 and 625 represent swapped faces provided by the identity transformation network, e.g., before re-alignment and stitching into the target image. The reference view of FIG. 6 is a frontal view. So all of the images associated with items 620 and 625 are aligned with a frontal view. FIG. 6 illustrates how implementations alter the appearance of the nose, eyes, eyebrows, lips, and wrinkles to match that of the source identity, but keeps the gaze direction, pose, skin tone, and expression of the target image intact, but in a way that is natural for the source identity. FIG. 6 also illustrates how implementations result in swapped images, i.e., represented by items 610 and 615, are photorealistic while the implementations remains scalable and capable of producing such images in real time.

FIG. 8 illustrates a diagrammatic representation of a machine in the example form of a computing device 800 within which a set of instructions, for causing the machine to perform any one or more of the methodologies discussed herein, may be executed. The computing device 800 may be a mobile phone, a smart phone, a netbook computer, a rackmount server, a router computer, a server computer, a personal computer, a mainframe computer, a laptop computer, a tablet computer, a desktop computer etc., within which a set of instructions, for causing the machine to perform any one or more of the methodologies discussed herein, may be executed. In one implementation, the computing device 800 may present an overlay UI to a user (as discussed above). In alternative implementations, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computing device 800 includes a processing device (e.g., a processor) 802, a main memory 804 (e.g., read-only memory (ROM), flash memory, dynamic random access memory (DRAM) such as synchronous DRAM (SDRAM)), a static memory 806 (e.g., flash memory, static random access memory (SRAM)) and a data storage device 818, which communicate with each other via a bus 830.

Processing device 802 represents one or more general-purpose processing devices such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 802 may also be one or more special-purpose processing devices such as an application specific integrated circuit (ASIC), a field programmable gate array (FPGA), a digital signal processor (DSP), network processor, or the like. The processing device 802 is configured to execute instructions 826 (e.g., instructions for an application ranking system) for performing the operations and steps discussed herein.

The computing device 800 may further include a network interface device 808 which may communicate with a network 820. The computing device 800 also may include a video display unit 810 (e.g., a liquid crystal display (LCD) or a cathode ray tube (CRT)), an alphanumeric input device 812 (e.g., a keyboard), a cursor control device 814 (e.g., a mouse) and a signal generation device 816 (e.g., a speaker). In one implementation, the video display unit 810, the alphanumeric input device 812, and the cursor control device 814 may be combined into a single component or device (e.g., an LCD touch screen).

The data storage device 818 may include a computer-readable storage medium 828 on which is stored one or more sets of instructions 826 (e.g., instructions for the application ranking system) embodying any one or more of the methodologies or functions described herein. The instructions 826 may also reside, completely or at least partially, within the main memory 804 and/or within the processing device 802 during execution thereof by the computing device 800, the main memory 804 and the processing device 802 also constituting computer-readable media. The instructions may further be transmitted or received over a network 820 via the network interface device 808.

While the computer-readable storage medium 828 is shown in an example implementation to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media. The term "computer-readable storage medium" does not include transitory signals.

In the above description, numerous details are set forth. It will be apparent, however, to one of ordinary skill in the art having the benefit of this disclosure, that implementations of the disclosure may be practiced without these specific details. Moreover, implementations are not limited to the exact order of some operations, and it is understood that some operations shown as two steps may be combined and some operations shown as one step may be split. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying," "determining," "calculating," "updating," "transmitting," "receiving," "generating," "changing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Implementations of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

According to one aspect, a method includes receiving a target image. The target image includes a face portion and a remaining portion. The method also includes aligning the face portion from an original view to a reference view to generate a target face and generating a swapped face by changing the target face to that of a source identity using a convolutional neural network trained to minimize loss of content from the target face and style from the source identity. The method also includes realigning the swapped face from the reference view to the original view and generating a swapped image by stitching the realigned swapped face with the remaining portion of the target image.

These and other aspects can include one or more of the following features. For example, the convolutional neural network may be further trained to minimize changes in illumination of the target face. As another example, the style of the source identity may include appearance of facial features. As another example, the content of the target face may include pose, expression, and gaze of the target face. As another example the convolutional neural network may use a loss function that is a weighted combination of content loss and style loss. As another example, the target image may be a frame from a video stream and the swapped image is provided as a frame in a video stream.

As another example, the content loss may be a sum of content loss computed over multiple layers of the convolutional neural network. Content loss in a layer l of the convolutional neural network can be represented by $$\frac{1}{|\Phi_l(x)|} \|\Phi_l(\hat{x}) - \Phi_l(x)\|_2^2,$$

where $\Phi_l(x)$ represents the source face in layer l, $\Phi_l(\hat{x})$ represents the swapped face in layer l, and $|\Phi_l(x)|$ represents the dimensionality of $\Phi_l(x)$ with shape $C_l \times H_l \times W_l$.

As another example, the style loss may be a sum of style loss computed over multiple layers of the convolutional neural network. Style loss in a layer l of the convolutional neural network is represented by $$\frac{1}{M} \sum_{i=1}^{M} d_c(\Psi_i(\Phi_l(\hat{x})), \Psi_i(\Phi_l(y_{NN(i)}))),$$

where $\Psi_i(\Phi_l(x))$ denotes the $i^{th}$ patch of M patches generated by looping over $H_l \times W_l$ possible locations in $\Phi_l(x)$ and extracting a squared k×k neighborhood around each point and $d_c$ is a distance metric between a patch in the swapped face $\Psi_i(\Phi_l(\hat{x}))$ and a best-matching patch at the same location of images in a style set for the source identity $\Psi_i(\Phi_l)/(y_{NN(i)}))$, where NN(i) selects the best-matching patch, for each patch at location i, from the images in the style set.

As another example, the convolutional neural network may be a first convolutional neural network that uses a loss function that is a weighted combination of content loss, style loss, and an illumination penalty. The illumination penalty may be a second convolutional neural network trained to discriminate lighting differences between pairs of images that uses a loss function that minimizes differences in lighting between the swapped face and the target face. In some implementations, the first convolutional neural network is a visual geometry group and the second convolutional neural network is a siamese convolutional neural network.

According to one aspect, a computer-readable medium stores an identity transformation neural network trained to generate a swapped face from a target face by changing the target face to that of a source identity. The identity transformation neural network may be trained by generating, from a plurality of images of the source identity, a set of style images for the source identity. Each of the plurality of images has a face portion and a remaining portion. Generating the set of style images includes, for each of the plurality of images, aligning the source face from a respective original view to a reference view. Training the identity transformation neural network also includes generating, from a subset of images in a content image library, target faces. Each image in the subset has a face portion and a remaining portion. Generating the target faces includes, for each of the images in the subset of images, aligning the face portion from a respective original view to the reference view. Training the identity transformation neural network also includes iteratively training the identity transformation neural network to generate a swapped face that changes a target face to the source identity by optimizing a loss function that is a weighted combination of content loss from the target face and style loss from the set of style images.

These and other aspects can include one or more of the following features. For example, the loss function may be a weighted combination of the content loss from the target face, style loss from the set of style images, and an illumination penalty that seeks to prevent the swapped face from having different illumination conditions from the target face. As another example, the content loss may be a sum of content loss computed over multiple layers of the identity transformation neural network. Content loss in a layer l of the identity transformation neural network is represented by $$\frac{1}{|\Phi_l(x)|} \|\Phi_l(\hat{x}) - \Phi_l(x)\|_2^2, \text{ where } \Phi_l(x)$$

represents the source face in layer l, $\Phi_l(\hat{x})$ represents the swapped face in layer l, and $|\Phi_l(x)|$ represents the dimensionality of $\Phi_l(x)$ with shape $C_l \times H_l \times W_l$.

As another example, the style loss may be a sum of style loss computed over multiple layers of the identity transformation neural network. Style loss in a layer l of the identity transformation neural network is represented by $$\frac{1}{M} \sum_{i=1}^{M} d_c(\Psi_i(\Phi_l(\hat{x})), \Psi_i(\Phi_l(y_{NN(i)}))),$$

where $\Psi_i(\Phi_l(x))$ denotes the $i^{th}$ patch of M patches generated by looping over $H_l \times W_l$ possible locations in $\Phi_l(x)$ and extracting a squared k×k neighborhood around each point and $d_c$ is a distance metric between a patch in the swapped face $\Phi_l$ ($\Phi_l(\hat{x})$) and a best-matching patch at the same location of images in a style set for the target identity $\Phi_l(\Phi_l(y_{NN(i)}))$, where NN(i) selects the best-matching patch, for each patch at location i, from the images in the style set. As another example, the style loss may minimize style loss over a plurality of patches in a layer of the neural network by minimizing, for each patch, a distance between the swapped face at the layer and a best matching patch from the set of style images. As another example, the subset may include at least 30 images. As another example, the iterative training may occur in two phases; a first phase trained to process and output images of a first size; and a second phase trained to process and output images of a second size.

According to one aspect, a system includes an identity transformation network trained to minimize loss of content from a target face and style from a source identity, at least one processor, and memory storing instructions that, when executed by the at least one processor, cause the system to perform operations. The operations include receiving a target image, the target image including a face portion and a remaining portion. The operations also include aligning the face portion from an original view to a reference view to provide a target face. The operations also include generating a swapped face by changing the target face to that of a source identity using the identity transformation network. The operations also include realigning the swapped face from the reference view to the original view and generating a swapped image by stitching the realigned swapped face with the remaining portion of the target image.

These and other aspects may include one or more of the following features. For example, the identity transformation network may be further trained to penalize changes in illumination of the target face. As another example, the identity transformation network may optimize a loss function that is a weighted combination of content loss, style loss, an illumination penalty, and a spatial smoothness factor. As another example, the target image may be a frame from a video stream and the swapped image is provided as a frame in a video stream. As another example, the reference view may be a frontal view.

What is claimed is:

1. A method comprising:
   receiving a target image, the target image including a face portion and a remaining portion;
   aligning the face portion from an original view to a reference view to generate a target face;
   generating a swapped face by changing the target face to that of a source identity using a convolutional neural network trained to minimize loss of content from the target face and loss of style from the source identity, wherein the loss of style is based on minimizing, at each layer of the convolutional neural network, a difference between a patch of the swapped face and a best-matching patch at the same location from a plurality of images of the source identity;
   realigning the swapped face from the reference view to the original view; and
   generating a swapped image by stitching the realigned swapped face with the remaining portion of the target image.

2. The method of claim 1, wherein the convolutional neural network is further trained to minimize changes in illumination of the target face.

3. The method of claim 1, wherein the style of the source identity includes appearance of facial features.

4. The method of claim 1, wherein the content of the target face includes pose, expression, and gaze of the target face.

5. The method of claim 1, wherein the convolutional neural network uses a loss function that is a weighted combination of content loss and style loss.

6. The method of claim 1, wherein the content loss is a sum of content loss computed over multiple layers of the convolutional neural network and content loss in a layer l of the convolutional neural network is represented by $$\frac{1}{|\Phi_l(x)|} \|\Phi_l(\hat{x}) - \Phi_l(x)\|_2^2, \text{ where } \Phi_l(x)$$

represents the source identity in layer l, $\Phi_l(\hat{x})$ represents the swapped face in layer l, and $|\Phi_l(x)|$ represents the dimensionality of $\Phi_l(x)$ with shape $C_l \times H_l \times W_l$.

7. The method of claim 1, wherein the loss of style is a sum of style loss computed over multiple layers of the convolutional neural network and style loss in a layer l of the convolutional neural network is represented by $$\frac{1}{M}\sum_{i=1}^{M} d_c(\Psi_i(\Phi_l(\hat{x})), \Psi_i(\Phi_l(y_{NN(i)}))),$$

where:
- $\Psi_i(\Phi_l(x))$ denotes an $i^{th}$ patch of M patches generated by looping over $H_l \times W_l$ possible locations in $\Phi_l(x)$ and extracting a squared k×k neighborhood around each point; and
- $d_c$ is a distance metric measuring the difference between the patch in the swapped face $\Psi_i(\Phi_l(\hat{x}))$ and the best-matching patch of images in a style set for the source identity $\Psi_i(\Phi_l(y_{NN(i)}))$, where NN(i) selects the best-matching patch, for each patch at location i, from the plurality of images of the source identity.

8. The method of claim 1, wherein the convolutional neural network is a first convolutional neural network and uses a loss function that is a weighted combination of content loss, style loss, and an illumination penalty, the illumination penalty being a second convolutional neural network trained to discriminate lighting differences between pairs of images and uses a loss function that minimizes differences in lighting between the swapped face and the target face.

9. The method of claim 8, where the first convolutional neural network is a visual geometry group and the second convolutional neural network is a siamese convolutional neural network.

10. The method of claim 1, wherein the target image is a frame from a live video stream and the swapped image is provided to a viewer as a frame in a video stream.

11. A non-transitory computer-readable medium storing an identity transformation neural network trained to generate a swapped face from a target face by changing the target face to that of a source identity, the identity transformation neural network being trained by:
- generating, from a plurality of images of the source identity, each of the plurality of images having a face portion and a remaining portion, a set of style images for the source identity by, for each of the plurality of images, aligning the face portion of each of the plurality of images from a respective original view to a reference view;
- generating target faces by, for each image of a subset of images in a content image library, each image in the subset representing a different identity having a face portion and a remaining portion, aligning the face portion from a respective original view to the reference view; and
- iteratively training the identity transformation neural network to generate a swapped face that changes a target face to the source identity by optimizing a loss function that is a weighted combination of content loss from the target face and style loss from the set of style images, wherein the style loss minimizes style loss over a plurality of patches in a layer of the neural network by minimizing, for each patch, a distance between the swapped face at the layer and a best-matching patch from the set of style images.

12. The computer-readable medium of claim 11, wherein the loss function is a weighted combination of the content loss from the target face, style loss from the set of style images, and an illumination penalty that seeks to prevent the swapped face from having different illumination conditions from the target face.

13. The computer-readable medium of claim 11, wherein the content loss is a sum of content loss computed over multiple layers of the identity transformation neural network and content loss in a layer l of the identity transformation neural network is represented by $$\frac{1}{|\Phi_l(x)|} \|\Phi_l(\hat{x}) - \Phi_l(x)\|_2^2,$$

where $\Phi_l(x)$ represents the source identity in layer l, $\Phi_l(\hat{x})$ represents the swapped face in layer l, and $|\Phi_l(x)|$ represents the dimensionality of $\Phi_l(x)$ with shape $C_l \times H_l \times W_l$.

14. The computer-readable medium of claim 11, wherein the style loss is a sum of style loss computed over multiple layers of the identity transformation neural network and style loss in a layer l of the identity transformation neural network is represented by $$\frac{1}{M}\sum_{i=1}^{M} d_c(\Psi_i(\Phi_l(\hat{x})), \Psi_i(\Phi_l(y_{NN(i)}))),$$

where:
- $\Psi_i(\Phi_l(x))$ denotes an $i^{th}$ patch of M patches generated by looping over $H_l \times W_l$ possible locations in $\Phi_l(x)$ and extracting a squared k×k neighborhood around each point; and
- $d_c$ is a distance metric measuring the distance between a patch in the swapped face $\psi_i(\Phi_l(\hat{x}))$ and the best-matching patch at the same location from the set of style images for the source identity $\Psi_i(\Phi_l(y_{NN(i)}))$, where NN(i) selects the best-matching patch, for each patch at location i, from the images in the set of style images.

15. The computer-readable medium of claim 12, wherein the illumination penalty is a second convolutional neural network trained to discriminate lighting differences between pairs of images and uses a loss function that minimizes differences in lighting between the swapped face and the target face.

16. The computer-readable medium of claim 11, wherein the iterative training occurs in two phases, a first phase trained to process and output images of a first size and a second phase trained to process and output images of a second size.

17. A system comprising:
- an identity transformation network trained to minimize loss of content from a target face and style from a source identity;
- at least one processor; and
- memory storing instructions that, when executed by the at least one processor, cause the system to perform operations including:
  - receiving a target image, the target image including a face portion and a remaining portion,
  - aligning the face portion from an original view to a reference view to provide a target face, generating a swapped face by changing the target face to that of a source identity using the identity transformation network that optimizes a loss function that is a weighted combination of content loss and style loss, wherein the style loss minimizes style loss over a plurality of patches in a layer of the identity transformation network by minimizing, for each patch, a distance between the swapped face at the layer and a best-matching patch from a set of style images for the source identity, realigning the swapped face from the reference view to the original view, and generating a swapped image by stitching the realigned swapped face with the remaining portion of the target image.

18. The system of claim 17, wherein the identity transformation network is further trained to penalize changes in illumination of the target face.

19. The system of claim 17, wherein the loss function is a weighted combination of the content loss, the style loss, an illumination penalty, and a spatial smoothness factor.

20. The system of claim 17, wherein the target image is a frame from a video stream and the swapped image is provided as a frame in a video stream.

21. The system of claim 17, wherein the reference view is a frontal view.

* * * * *

UNITED STATES PATENT AND TRADEMARK OFFICE
CERTIFICATE OF CORRECTION

PATENT NO. : 10,552,977 B1
APPLICATION NO. : 15/490274
DATED : February 4, 2020
INVENTOR(S) : Theis et al.

Page 1 of 1

It is certified that error appears in the above-identified patent and that said Letters Patent is hereby corrected as shown below:

In the Claims

In Column 19, Claim 7, Lines 18-19, delete "patch of images in a style set for the source" and insert --patch--, therefor.

In Column 20, Claim 14, Line 24, delete "layer 1" and insert --layer $l$--, therefor.

Signed and Sealed this
Twenty-fourth Day of November, 2020

Andrei Iancu
*Director of the United States Patent and Trademark Office*